(12) United States Patent
Mukai et al.

(10) Patent No.: US 6,266,490 B1
(45) Date of Patent: *Jul. 24, 2001

(54) ANTISTATIC VIEWFINDER

(75) Inventors: Hiromu Mukai; Yasuo Maeda, both of Kawachinagano (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/938,518

(22) Filed: Sep. 26, 1997

(30) Foreign Application Priority Data

Sep. 30, 1996 (JP) .................................................... 8-258522

(51) Int. Cl.$^7$ .................................................... G03B 13/02
(52) U.S. Cl. ...................... 396/384; 396/150; 396/354; 396/373; 359/507
(58) Field of Search ........................... 396/373, 376–386, 396/354, 148, 150; 359/507

(56) References Cited

U.S. PATENT DOCUMENTS

| | | |
|---|---|---|
| 4,690,519 | 9/1987 | Clarke et al. . |
| 4,804,987 | 2/1989 | Arai . |
| 5,148,198 * | 9/1992 | Shiba ..................... 396/616 |
| 5,250,969 | 10/1993 | Abe et al. . |
| 5,449,709 * | 9/1995 | Imae et al. ............. 524/154 |
| 5,521,756 * | 5/1996 | Meier et al. ............ 359/507 |
| 5,521,761 * | 5/1996 | Morooka ................ 359/790 |
| 5,543,270 * | 8/1996 | Akao et al. ............. 439/347 |
| 5,570,229 * | 10/1996 | Kanamori ............... 359/431 |
| 5,687,023 * | 11/1997 | Oshita .................... 359/422 |
| 5,805,941 * | 9/1998 | Iyama .................... 396/274 |
| 5,827,584 * | 10/1998 | Akao et al. ............. 428/35.7 |
| 5,850,311 * | 12/1998 | Hankawa et al. ....... 359/644 |

* cited by examiner

Primary Examiner—Alan A. Mathews
(74) Attorney, Agent, or Firm—Burns, Doane, Swecker & Mathis, LLP

(57) ABSTRACT

At minimum, a member near an image plane that is observed through an eyepiece is made of antistatic resin obtained by giving the resin itself ion conductivity so that its antistatic effect can be of long duration.

52 Claims, 7 Drawing Sheets

ANTISTATIC VIEWFINDER

BACKGROUND OF THE INVENTION

1. Field of the Invention

The present invention pertains to an antistatic viewfinder, and more particularly, to a viewfinder used in such things as a camera using silver halide film, an electronic image recording device or binoculars.

2. Description of the Prior Art

Conventionally, either glass or resin has been used in optical systems, but the use of resin has increased in recent years due to its superior malleability and lower cost. Normally, resin easily attracts static atmospheric charge, allowing dust and dirt particles to easily adhere to the surface of the resin via adsorption. Consequently, if for example optical members of a viewfinder equipped with an eyepiece are constructed of resin, the problem arises that the dust and dirt particles that have become adhered to area around the image plane of the object image become enlarged and easily visible.

In response to this problem, one countermeasure is to clean the surfaces of the optical members prior to their incorporation into the optical systems and make the viewfinder airtight, thereby preventing dust and dirt particles from adhering to the optical members. Another countermeasure is to lower the surface resistance of the optical member by either applying an antistatic coating or mixing an antistatic agent into the resin, thereby making It more difficult for the surfaces to become charged and for dust and dirt particles to adsorb to them.

However, because adsorption Is operating on the dust and dirt particles adhering to the surfaces of the optical member due to electrostatic charging of the optical member, it is very difficult to eliminate them completely even if the surfaces of the optical members are cleaned. Moreover, the application of an antistatic coating does not affect the dust and dirt particles that are already adhering to the surfaces of the optical member, and increases the cost of manufacture as well. In addition, with the method involving the mixture of an antistatic agent Into the resin, while the antistatic agent continues to seep out toward the optical member surfaces in small amounts and an antistatic property, i.e., an anticharging property, is maintained, this continues for only about a year. Further, there is another problem that the dust and dirt particles that have adhered to members other than the optical members In the viewfinder block, such as holders or the field mask, move to the surfaces of the optical members.

SUMMARY OF THE INVENTION

The present invention was made in view of this situation. The technical Issue to be resolved by the present invention is to prevent the components of a viewfinder from becoming charged and to provide an antistatic viewfinder in which dust and dirt particles are not present to a noticeable extent.

In order to resolve the technical issue described above, the present invention Is essentially a viewfinder equipped with an eyepiece, in which at least the member regarding which focusing is performed when observation is made through the eyepiece, or the members located near said member, are made of antistatic resin. In the present invention, a dust prevention effect is efficiently obtained by using antistatic resin for members as to which a dust prevention effect is desired. It is acceptable if all components of the viewfinder are made of antistatic resin.

The antistatic resin referred to above is a resin that is itself given ionic conductivity.

In the construction described above, an antistatic resin obtained by giving the resin itself ionic conductivity has a low surface resistance and does not easily become charged. Moreover, the antistatic effect lasts longer in comparison with the method in which an antistatic coating is applied to the surfaces or in which an antistatic agent is mixed into the resin.

Therefore, by using such a resin having a relatively longer-lasting antistatic effect for the optical members near the image plane that is observed through the eyepiece, a viewfinder may be obtained in which dust and dirt particles are not noticeably present over a long period of time.

Preferably the present invention may be realized in various forms as shown below.

A first embodiment is a Keplerian real image viewfinder using which the object image formed by means of the object lens is observed through the eyepiece, wherein optical members located near the image plane on which the object image is formed, i.e., transparent or semi-transparent members through which light passes—lenses and prisms, for example—are made of antistatic resin.

In this construction, by using antistatic resin for optical members near the image plane on which the object image is formed by means of the object lens, it can be made difficult for dust and dirt particles to adhere to these optical members without their undergoing special processing, such as the application of an antistatic coating, and cleaning of dust and dirt particles that do adhere to the optical members can be made easier. In this way, the amount of dust and dirt particles near the image plane of the object image that is observed through the eyepiece may be easily reduced or eliminated.

Therefore, the antistatic viewfinder having the construction described above may prevent the viewfinder components from becoming charged and the dust and dirt particles from becoming noticeably present.

A second embodiment is a Keplerian real image viewfinder using which the object image formed by means of the object lens is observed through the eyepiece, wherein holding members that hold the optical members and field stop, and that are located near the image plane on which the object image is formed, are made of antistatic resin.

In the construction described above, by using antistatic resin for the molding of the holding members near the image plane on which the object image is formed by means of the object lens, the amount of dust and dirt particles that adhere to the holding members may be reduced, and the amount of dust and dirt particles that move from the holding members to the surfaces of the optical members and are viewed through the eyepiece may be easily reduced or eliminated.

Therefore, the antistatic viewfinder having the construction described above may prevent the viewfinder components from becoming charged and the dust and dirt particles from becoming noticeably present.

A third embodiment is a Keplerian real image viewfinder using which the object image formed by means of the object lens is observed through the eyepiece, wherein the field stop located near the image plane on which the object image is formed is made of antistatic resin.

In the construction described above, by using antistatic resin for the field stop located near the image plane on which the object image is formed by means of the object lens, the amount of dust and dirt particles that adhere to the field stop may be reduced, and the amount of dust and dirt particles that move from the field stop to the surfaces of the optical members and are viewed through the eyepiece may be easily reduced or eliminated.

Therefore, in the antistatic viewfinder having the construction described above, electrostatic charging is prevented and dust and dirt particles do not become noticeably present.

The present invention may be applied to viewfinders other than real image viewfinders.

A fourth embodiment is an Albada reverse-Galilean viewfinder in which at least the member on which the optical image frame is placed is made of antistatic resin.

In the construction described above, the member on which is located the optical image frame to perform display of the field of view and the AF area is located near the image plane that is observed through the eyepiece. By having the member on which the optical image frame is placed be made of antistatic resin, it becomes difficult for dust and dirt particles to adhere to surfaces near the image plane observed through the eyepiece.

Therefore, a viewfinder may be obtained in which dust and dirt particles are not noticeably present.

A fifth embodiment is an illuminated reverse-Galilean viewfinder in which at least the member on which the optical image frame is placed is made of antistatic resin.

In the construction described above, the member on which is located the optical image frame to perform display of the field of view and the AF area is located near the image plane that is observed through the eyepiece. By having the member on which the optical image frame is placed be made of antistatic resin, dust and dirt particles are prevented from adhering to surfaces near the image plane observed through the eyepiece, and a viewfinder may be realized in which dust and dirt particles are not noticeably present.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

The antistatic viewfinders pertaining to the embodiments of the present invention are explained in detail below with reference to FIGS. 1 through 7.

Since the viewfinders pertaining to the embodiments of the present invention are made of antistatic resin in order to prevent the adherence of dust and dirt particles, the antistatic resin will first be explained.

It is preferred that a viewfinder device having a long-lasting dust adherence prevention effect be made using a resin that is obtained by giving the resin itself ionic conductivity and that can have a long-lasting antistatic effect without undergoing special processing.

Specifically, resins such as Acrylics Polymethylmethacrylate (PMMA), Acrylonitrile Butadiene Styrene (ABS), and Polycarbonate (PC) may be made into strong antistatic resins that are themselves given ionic conductivity by means of polymer alloying technology in which they are combined with a hydrophilic polymer, such as methoxypolyethylene glycol methacrylate copolymer, high-molecular-weight polyethylene glycol, epichlorohydrine/ethylene oxide copolymer, methacrylate polymer containing quaternary ammonium salt, or polyethylene glycol copolymer polyamide. The resin may be made a permanent antistatic resin through this polymer alloying technology in which it is combined with a hydrophilic polymer.

The embodiments are explained in sequence below.

First, the first embodiment, which is a Keplerian real image viewfinder in which antistatic resin is used, will be explained.

Figure 1:
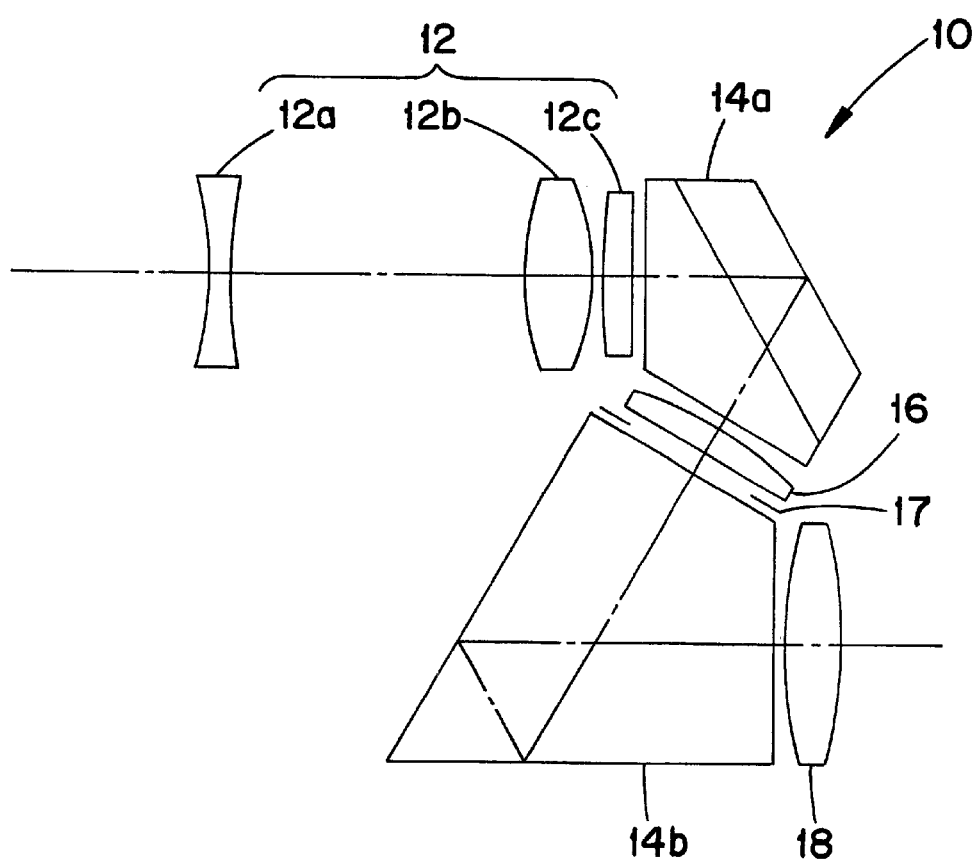
FIG. 1 is a drawing showing the construction of the viewfinder pertaining to the first embodiment of the present invention.

Viewfinder 10 of this embodiment has an optical axis separate from that of the photo-taking lens, as shown in FIG. 1, a drawing showing the construction of said viewfinder. This viewfinder 10 comprises, from the object side and along the optical axis, object lens unit 12, first prism 14a, condenser lens 16, field stop 17, second prism 14b and eyepiece 18.

Object lens unit 12 comprises three lenses 12a, 12b and 12c, and forms an object image, which is a real image, in the vicinity of condenser lens 16 and field stop 17. First prism 14a and second prism 14b invert the formed object image horizontally as well as vertically.

First prism 14a is a roof prism while second prism 14b is a pentaprism. Eyepiece 18 enlarges the formed object image such that it may be observed. The focal length of eyepiece 18 is normally 10 mm through 70mm, which is equivalent to approximately ×3.6 to ×25 magnification in terms of magnification by a magnifying glass. Therefore, dust and dirt particles near the image plane where the object image is formed are enlarged when observed and thus can be easily seen. Field stop 17 limits the range that maybe observed.

In this viewfinder 10, first prism 14a, condenser lens 16 and second prism 14b, which are all optical members, are made of antistatic resin. For the antistatic resin, a highly transparent PMMA-based resin or PC-based resin that is obtained by giving the resin itself with ionic conductivity is used. In this viewfinder 10, a roof prism and pentaprism are used for the optical systems that invert the object image vertically and horizontally, but other optical systems comprising a Porroprism or pechan prism may be used instead.

In that case, it is possible to have the optical members comprising the optical systems that invert the object image vertically and horizontally be made of antistatic resin.

A member that is molded using non-transparent antistatic resin is used for field stop 17. The antistatic resin used for field stop 17 is also an antistatic resin that is obtained by giving the resin itself with ionic conductivity. However, since the field stop is non-transparent and dust and dirt particles would not be observed even if they adhered to it, resin having an antistatic property of a relatively short duration, such as resin mixed with an antistatic agent, may be used.

Figure 2:
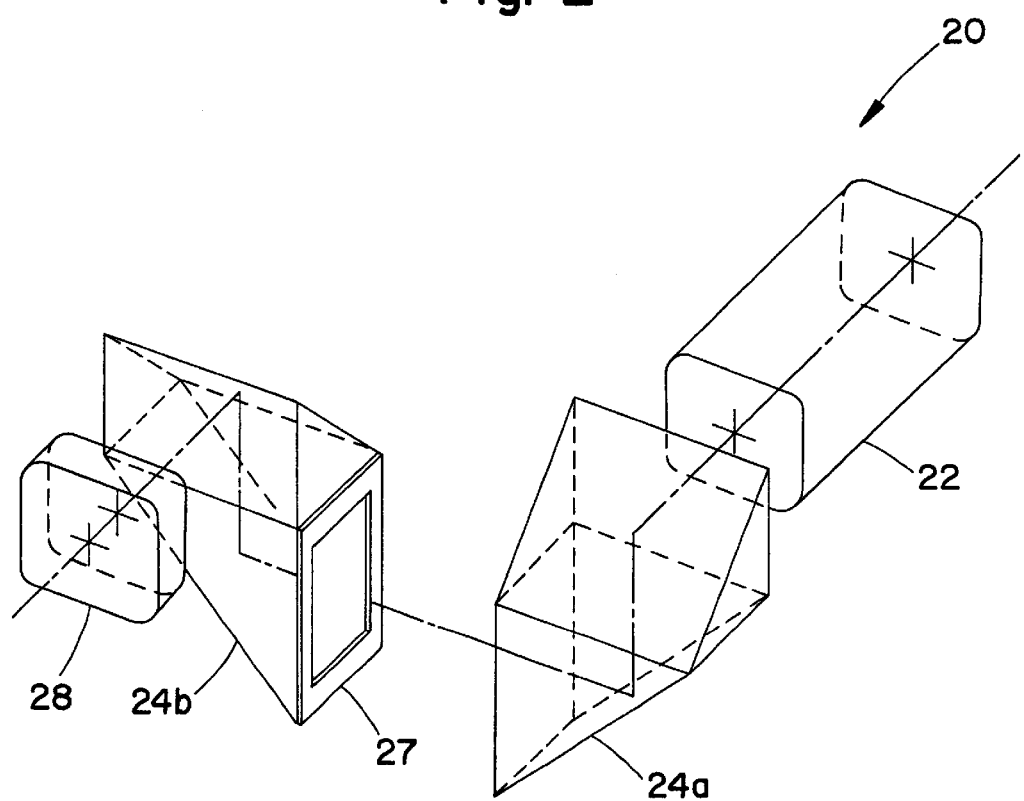
FIG. 2 is also a drawing showing the construction of the viewfinder pertaining to the first embodiment of the present invention.

A Keplerian real image viewfinder that also pertains to the first embodiment and in which Porroprisms are used for the optical systems that invert the object image vertically and horizontally will now be explained with reference to FIG. 2.

This viewfinder 20 comprises, from the object side and along the optical axis, object lens unit 22, first prism 24a which is a Porroprism, field stop 27, second prism 24b which is a Porroprism, and eyepiece 28. In this viewfinder 20, the object image is formed between first prism 24a and field stop 27, and therefore antistatic resin is used for the members near the image plane, i.e., first prism 24a, field stop 27 and second prism 24b. However, since dust and dirt particles on the eyepiece side of the image plane are particularly noticeable when the user looks into viewfinder 20 and field stop 27 is non-transparent, it is acceptable if only second prism 24b is made of antistatic resin.

The viewfinder pertaining to the second embodiment, in which the holders that hold the optical systems are made of antistatic resin, will now be explained.

Figure 3:
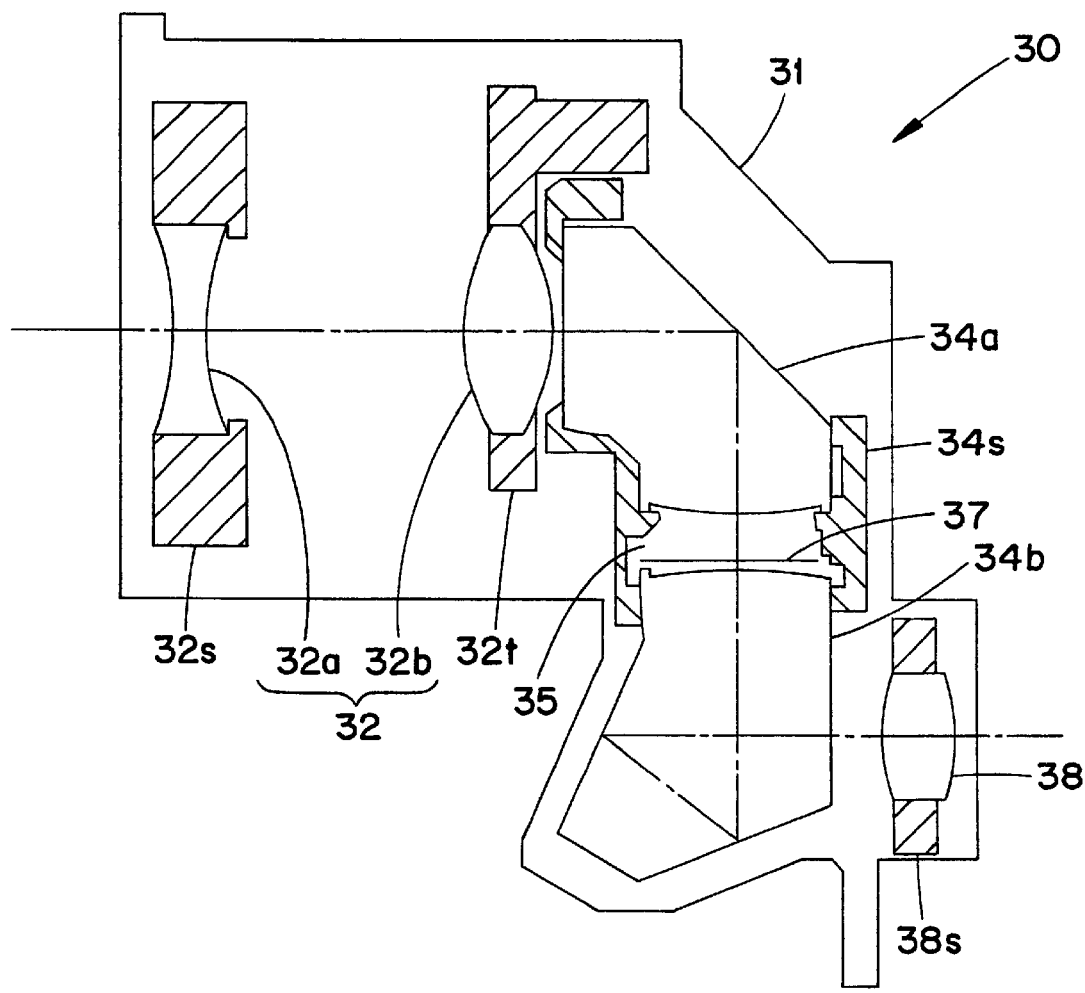
FIG. 3 is a drawing showing the construction of the viewfinder pertaining to the second embodiment of the present invention.
Figure 4:
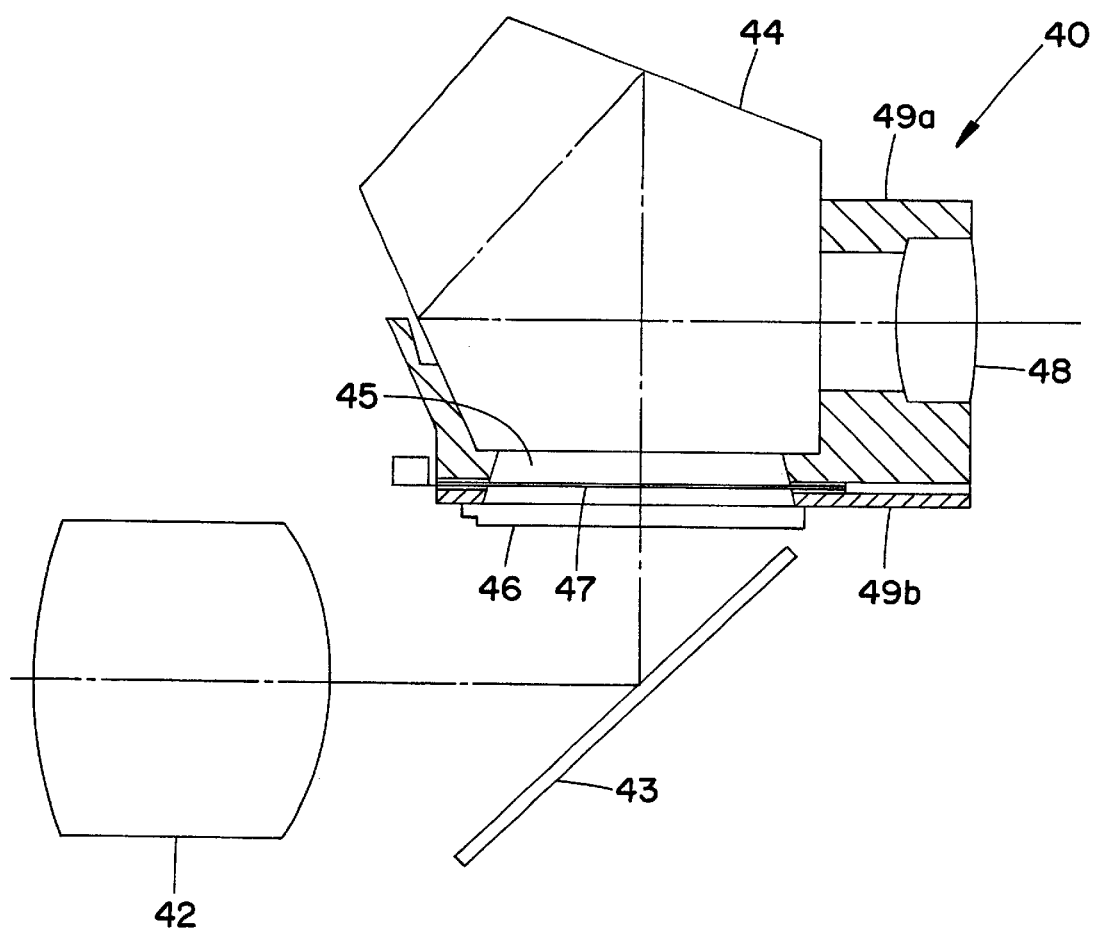
FIG. 4 is a drawing showing the construction of the viewfinder pertaining to the third embodiment of the present invention.

In this viewfinder 30, optical systems and holders that hold the optical systems are placed on viewfinder plate 31, as shown in FIG. 3 showing the construction of said viewfinder. In other words, this viewfinder 30 comprises, from the object side and along the optical axis, object lens unit 32, first prism 34a, field stop 37, second prism 34b and eyepiece 38, and the object image is formed between first prism 34a and field stop 37.

Object lens unit 32 comprises two lenses 32a and 32b, which are held by lens holders 32s and 32t, respectively. First prism 34a, field stop 37 and second prism 34b are held by inverting system holder 34s. Eyepiece 38 is held by eyepiece holder 38s. Lens holders 32s, 32t, 34s and 38s are fixed to viewfinder plate 31.

In this viewfinder 30, members made of molded non-transparent antistatic resin are used for inverting system holder 34s, field stop 37 and viewfinder plate 31. Members made of molded transparent antistatic resin are used for first prism 34a and second prism 34b comprising the inverting optical systems. Thus, antistatic resin is used for all members 31, 34a, 34b, 34s and 37 that comprise image formation area 35, including the image plane on which the object image is formed by object lens unit 32, and image formation area 35 is surrounded by antistatic resin. Therefore, it is possible to prevent dust and dirt particles from adhering to members 31, 34a, 34b, 34s and 37 that comprise image formation area 35 and to prevent dust and dirt particles from being observed when the user looks into viewfinder 30. However, a dust prevention effect may be obtained even if all of the members 31, 34a, 34b, 34s and 37 that surround image formation area 35 are not made of antistatic resin and only some of said members are made of antistatic resin.

The third embodiment, in which antistatic resin is used in the viewfinder of a single lens reflex camera, will now be explained.

This viewfinder 40 comprises, from the object side and along the optical axis, photo-taking lens 42 which is equivalent to an object lens, quick-return mirror 43, focusing screen 46, field stop 47, pentaprism 44 and eyepiece 48. The light rays from the object pass through photo-taking lens 42 and are reflected by quick-return mirror 43, and an image is formed on focusing screen 46. The focal plane of focusing screen 46 exists on the side of pentaprism 44. The object image that is formed on focusing screen 46 is limited in terms of observation range by field stop 47. The image light passes through pentaprism 44, an inverting optical system on the eyepiece side, and the image is enlarged by eyepiece 48 and observed.

In this viewfinder 40, a member made of molded transparent antistatic, resin is used for focusing screen 46. In other words, since photo-taking lens 42 is interchangeable, focusing screen 46 on the side of quick-return mirror 43 may be exposed to the outside, and therefore focusing screen 46 is made such that electrostatic charging is prevented and dust and dirt particles do not easily adhere to it.

In addition, members made of molded non-transparent antistatic resin are used for first holder 49a that holds pentaprism 44 and eyepiece 48 and second holder 49b that holds focusing screen 46. Therefore, image formation area 45, including the focal plane of focusing screen 46, is surrounded by pentaprism 44 as well as focusing screen 46, first holder 49a and second holder 49b which are made of molded antistatic resin.

Field stop 47 is located in this image formation area 45. Field stop 47 is made of antistatic resin, and as shown in FIG. 5, is constructed such that it may alternate between fields of view of two different sizes.

Specifically, field stop 47 has fixed frame 52 which is a member made of molded antistatic resin, a pair of movable frames 54 and 56, and supporting pins 58.

Fixed frame 52 comprises two long pieces 52a and two short pieces 52b which are combined such that they form a rectangular shape, and has rectangular opening 52x. Movable frames 54 and 56 comprise long pieces 54a and 56a to which short pieces 54b and 56b are connected, respectively, such that each frame forms essentially three sides of a rectangle. Movable frames 54 and 56 are symmetrically located around fixed frame 52. Movable frames 54 and 56 have long holes 54s and 56s on short pieces 54b and 56b, respectively. By placing short pieces 54b of movable frame 54 and short pieces 56b of movable frame 56 one on top of the other and placing supporting pins 58 through long holes 54s and 56s, movable frames 54 and 56 are supported such that they may freely move horizontally and long pieces 54a and 56a may move close to or away from each other.

Figure 5A:
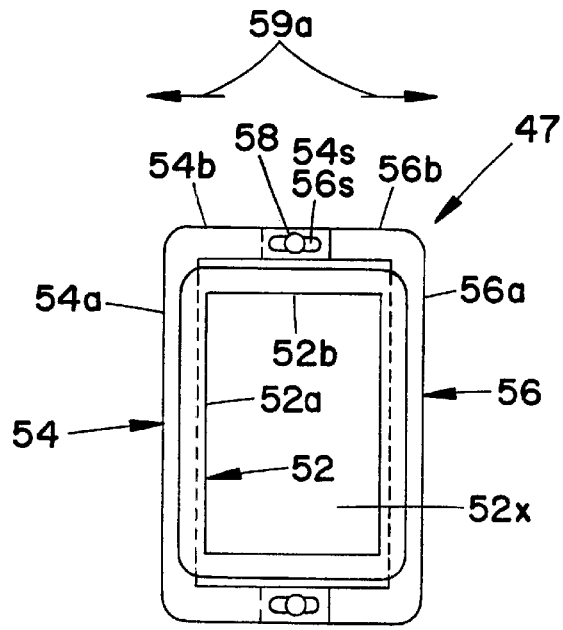
FIG. 5(A) is a drawing showing the situation which movable frames of the field stop do not hinder opening of fixed frame in the viewfinder shown in FIG. 4.
Figure 5B:
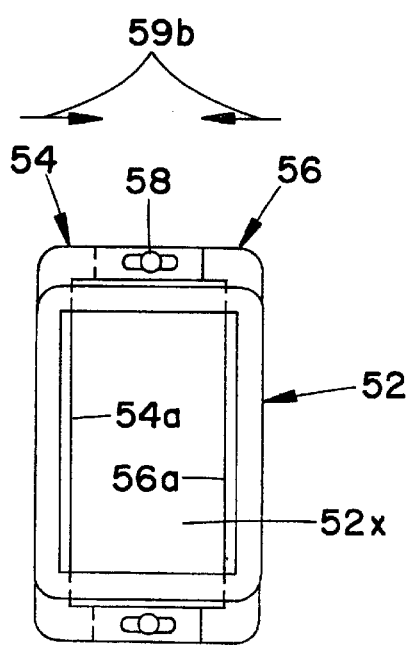
FIG. 5(B) is a drawing showing the situation which movable frames of the field stop are closer to each other in the viewfinder shown in FIG. 4.

As shown by arrow 59a in FIG. 5(A), when long piece 54a of movable frame 54 and long piece 56a of movable frame 56 are apart, movable frames 54 and 56 do not hinder opening 52x of fixed frame 52. Therefore, a field of view is formed by means of opening 52x of fixed frame 52. On the other hand, when movable frames 54 and 56 are closer to each other, as shown by arrow 59b in FIG. 5(B), long piece 54a of movable frame 54 and long piece 56a of movable frame 56 invade opening 52x of fixed frame 52. Therefore, a field of view is formed that comprises opening 52x of fixed frame 52 narrowed by long piece 54a of movable frame 54 and long piece 56a of movable frame 56.

Movable frames 54 and 56 are made of non-transparent antistatic resin. Unless they are treated so as to have an antistatic property, they become electrostatically charged and adsorb dust and dirt particles due to the friction that occurs when they are moved in order to change the field of view. Dust and dirt particles that have been adsorbed move to the surfaces of optical members 44 and 46 when movable frames 54 and 56 are moved and are then observed when the user looks into viewfinder 50. Therefore, if movable members 54 and 56 are made of antistatic resin as in the case of field stop 47 of this embodiment, a significant dust prevention effect may be obtained.

Figure 6:
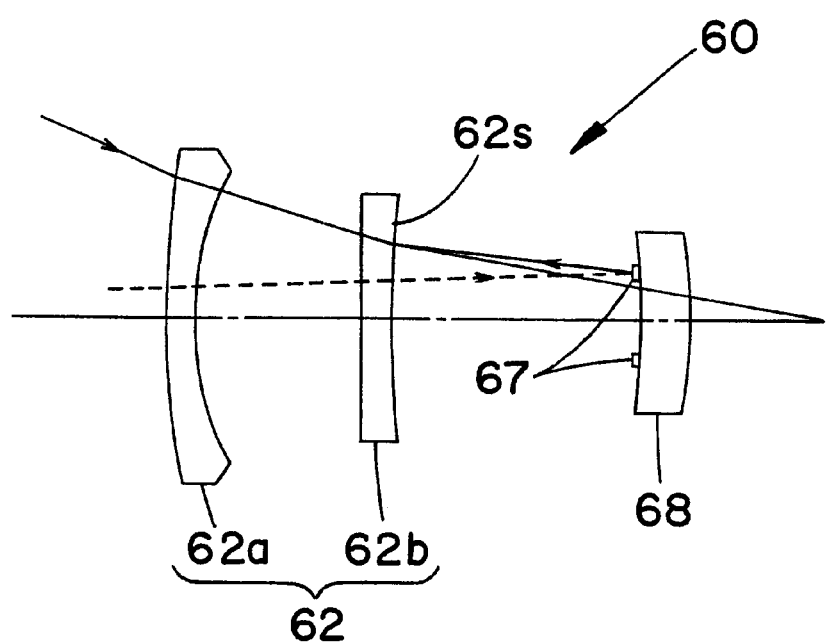
FIG. 6 is a drawing showing the construction of the viewfinder pertaining to the fourth embodiment of the present invention.

The fourth embodiment, in which antistatic resin is used in an Albada reverse-Galllean viewfinder, will now be explained with reference to FIG. 6, showing its construction.

This viewfinder 60 is equipped with object lens unit 62 comprising two concave lenses 62a and 62b and convex eyepiece 68. The user observes through eyepiece 68 the virtual image of the object formed by object lens unit 62. Optical image frame 67 to perform display of the field of view and the AF area is located on the object side surface of eyepiece 68. Half-mirror surface 62s is formed on. The surface of lens 62b of object lens unit 62 that faces optical image frame 67. Optical image frame 67 is reflected by half-mirror surface 62s and is viewed as overlapping with the object image. Because focusing is performed regarding optical image frame 67 when the user looks into viewfinder 60, dust and dirt particles on the optical surfaces near optical image frame 67 are noticeably present. Therefore, in this viewfinder 60, antistatic resin is used for eyepiece 68 on which optical image frame 67 is located. Incidentally, where, unlike this viewfinder 60, a plate that has an optical image frame is located near to but separate from the eyepiece, antistatic resin may be used for the plate and eyepiece.

Figure 7:
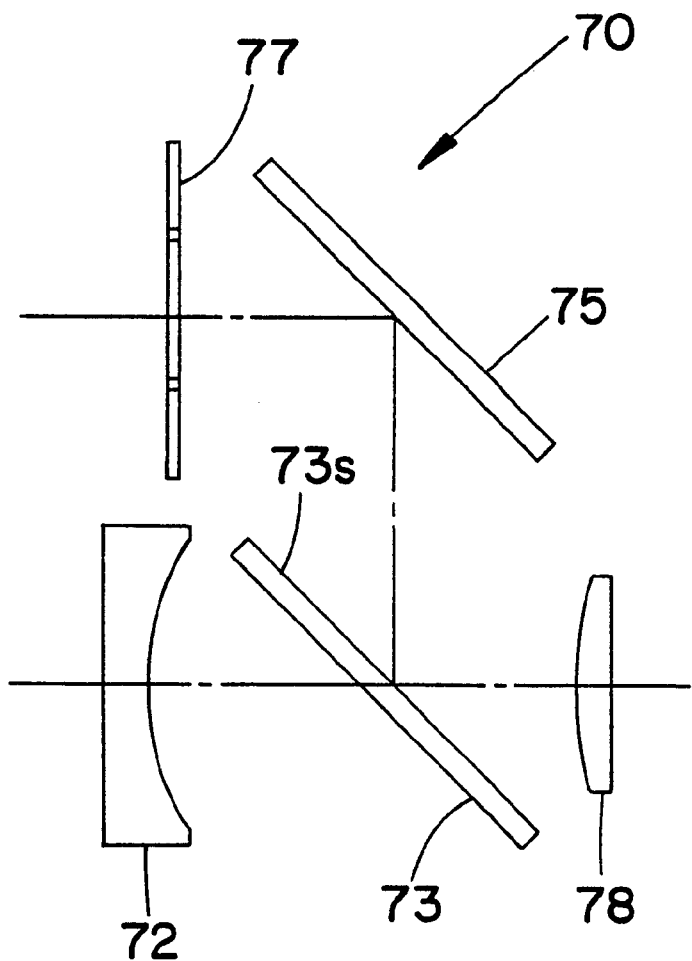
FIG. 7 is a drawing showing the construction of the viewfinder pertaining to the fifth embodiment of the present invention.

The fifth embodiment, in which antistatic resin is used in an illuminated reverse-Galilean viewfinder, will now be explained with reference to FIG. 7, showing its construction.

This viewfinder 70 is equipped with half-mirror 73 between object lens 72 and eyepiece 78 so that optical image frame sheet 77 may be viewed as overlapping with the object image due to its reflecting toward eyepiece 78 by means of reflecting mirror 75 and half-mirror surface 73s of half-mirror 73. Optical image frame sheet 77 is a sheet made of antistatic resin and has a field of view and AF area display printed on it. Because focusing is performed regarding optical image frame sheet 77 when the user looks into this viewfinder 70, if dust and dirt particles exist in its vicinity, they are noticeably present. However, because optical image frame sheet 77 is made of antistatic resin, it is difficult for dust and dirt particles to adhere to it. Therefore, dust and dirt particles are not noticeably present in this viewfinder 70.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. An antistatic viewfinder equipped with an eyepiece, comprising:
    an eyepiece holder;
    a support member that supports the eyepiece holder; and
    an antistatic member which is made of antistatic resin wherein the resin itself has conductivity, the conductivity of the antistatic resin providing an antistatic property that reduces adhesion of dust to the antistatic member, the antistatic member being located inside the field of view of an observer and sufficiently adjacent to an object image when observation is made through the eyepiece to reduce an amount of dust that would otherwise be noticeable near the object image when observation is made through the eyepiece.

2. The antistatic viewfinder referred to in claim 1, wherein said antistatic resin comprises a matrix resin and a hydrophilic polymer.

3. The antistatic viewfinder referred to in claim 2, wherein said hydrophilic polymer is either methoxypolyethylene glycol methacrylate copolymer, high-molecular-weight polyethylene glycol, epichlorohydrine/ethylene oxide copolymer, methacrylate polymer containing quaternary ammonium salt, or polyethylene glycol copolymer polyamide.

4. The antistatic viewfinder referred to in claim 2, wherein the antistatic resin is comprised of a matrix resin of either Acrylics Polymethylmethacrylate (PMMA), Acrylonitrile Butadiene Styrene (ABS), or Polycarbonate (PC).

5. The antistatic viewfinder referred to in claim 1, wherein the antistatic viewfinder is configured as a Keplerian real image viewfinder in which an object image formed by an object lens is observed through the eyepiece.

6. The antistatic viewfinder referred to in claim 5, wherein said antistatic resin comprises a matrix resin and a hydrophilic polymer.

7. The antistatic viewfinder referred to in claim 5, wherein the viewfinder further comprises from the object side.
    the object lens, a first prism which comprises a Porro prism, a field stop, a second prism which comprises a Porro prism, and the eyepiece, and wherein at least said second prism is made of antistatic resin.

8. The antistatic viewfinder referred to in claim 1, wherein the antistatic viewfinder is configured as a Keplerian real image viewfinder in which an object image formed by an object lens is observed through the eyepiece, wherein the antistatic member is a field stop.

9. The antistatic viewfinder referred to in claim 8, wherein said antistatic resin comprises a matrix resin and a hydrophilic polymer.

10. The antistatic viewfinder referred to in claim 3, wherein said antistatic resin is a polymer alloy.

11. A Keplerian real image viewfinder in which an object image formed by an object lens is observed through an eyepiece, comprising;
    an optical member holding member and a field stop holding member which are located near the image plane on which the object image is formed, and which are made of antistatic resin wherein the resin itself has conductivity.

12. The Keplerian real image viewfinder referred to in claim 11, wherein said antistatic resin comprises a matrix resin and a hydrophilic polymer.

13. The Keplerian real image viewfinder referred to in claim 11, further comprising from the object side;
    the object lens, a quick-turn mirror, a focusing screen, the field stop, a prism and the eyepiece, as well as a first holder that holds said prism and eyepiece and a second holder that holds said focusing screen, and wherein any of said focusing screen, first holder or second holder is made of antistatic resin.

14. The Keplerian real image viewfinder referred to in claim 12, wherein said hydrophilic polymer is either methoxypolyethylene glycol methacrylate copolymer, high-molecular-weight polyethylene glycol, epichlorohydrine/ethylene oxide copolymer, methacrylate polymer containing quaternary ammonium salt, or polyethylene glycol copolymer polyamide.

15. The Keplerian real image viewfinder referred to in claim 14, wherein said antistatic resin is a polymer alloy.

16. The Keplerian real image viewfinder referred to in claim 11, wherein the antistatic resin is comprised of a matrix resin of either Acrylics Polymethylmethacrylate (PMMA), Acrylonitrile Butadiene Styrene (ABS), or Polycarbonate (PC).

17. A Keplerian real image viewfinder in which an object image formed by an object lens is observed through an eyepiece, comprising:

an optical member which forms an image formation area that includes an image plane on which the object image is formed by an object lens unit, and which is made of antistatic resin wherein the resin itself has conductivity;

a field stop which forms the image formation area that includes the image plane on which the object image is formed by the object lens unit, and which is made of antistatic resin wherein the resin itself has conductivity; and, a holding member which holds said optical member and said field stop, and which forms the image formation area that includes the image plane on which the object image is formed by the object lens unit, and which is made of antistatic resin wherein the resin itself has conductivity.

18. The Keplerian real image viewfinder referred to in claim 17, wherein said antistatic resin comprises a matrix resin and a hydrophilic polymer.

19. The Keplerian real image viewfinder referred to in claim 18, wherein said hydrophilic polymer is either methoxypolyethylene glycol methacrylate copolymer, high-molecular-weight polyethylene glycol, epichlorohydrine/ethylene oxide copolymer, methacrylate polymer containing quaternary ammonium salt, or polyethylene glycol copolymer polyamide.

20. The Keplerian real image viewfinder referred to in claim 19, wherein said antistatic resin is a polymer alloy.

21. The Keplerian real image viewfinder referred to in claim 17, wherein the antistatic resin is comprised of a matrix resin of either Acrylics Polymethylmethacrylate (PMMA), Acrylonitrile Butadiene Styrene (ABS), or Polycarbonate (PC).

22. An antistatic viewfinder comprising:

an eyepiece;

an eyepiece holder;

a support member that supports the eyepiece holder; and an antistatic member that is made of antistatic resin wherein the resin itself has conductivity, the conductivity of the antistatic resin providing an antistatic property that reduces adhesion of dust to the antistatic member, wherein one of the antistatic member and an image of the antistatic member is located inside the field of view of an observer and sufficiently adjacent to an object image when observation is made through the eyepiece to reduce an amount of dust that would otherwise be noticeable near the object image when observation is made through the eyepiece.

23. The antistatic viewfinder referred to in claim 22, wherein the antistatic viewfinder is configured as an Albada reverse-Galilean viewfinder, and wherein the antistatic member is an optical image frame which displays a field of view and an AF area.

24. The antistatic viewfinder referred to in claim 23, wherein said antistatic resin comprises a matrix resin and a hydrophilic polymer.

25. The antistatic viewfinder referred to in claim 22, wherein The antistatic viewfinder is configured as an illuminated reverse-Galilean viewfinder, and wherein the antistatic member is an optical image frame which displays a field of view and an AF area.

26. The antistatic viewfinder referred to in claim 25, wherein said antistatic resin comprises a matrix resin and a hydrophilic polymer.

27. The antistatic viewfinder referred to in claim 25, wherein said optical image frame is an antistatic resin sheet on which the field of view and the AF area are displayed.

28. The antistatic viewfinder referred to in claim 22, wherein said antistatic resin comprises a matrix resin and a hydrophilic polymer.

29. The antistatic viewfinder referred to in claim 28, wherein said hydrophilic polymer is either methoxypolyethylene glycol methacrylate copolymer, high-molecular-weight polyethylene glycol, epichlorohydrine/ethylene oxide copolymer, methacrylate polymer containing quaternary ammonium salt, or polyethylene glycol copolymer polyamide.

30. The antistatic viewfinder referred to in claim 29, wherein said antistatic resin is a polymer alloy.

31. The antistatic viewfinder referred to in claim 22, wherein the antistatic resin is comprised of a matrix resin of either Acrylics Polymethylmethacrylate (PMMA), Acrylonitrile Butadiene Styrene (ABS), or Polycarbonate (PC).

32. An antistatic viewfinder equipped with an eyepiece, comprising:

a transparent optical member which is located near an object image when observation is made through the eyepiece, and which is made of antistatic resin wherein the resin itself has conductivity.

33. The antistatic viewfinder referred to in claim 32, further comprising an optical member holding member made of non-transparent resin that supports the transparent optical member.

34. The antistatic viewfinder referred to in claim 32, wherein said antistatic resin comprises a matrix resin and a hydrophilic polymer.

35. The antistatic viewfinder referred to in claim 34, wherein said hydrophilic polymer is either methoxypolyethylene glycol methacrylate copolymer, high-molecular-weight polyethylene glycol, epichlorohydrine/ethylene oxide copolymer, methacrylate polymer containing quaternary ammonium salt, or polyethylene glycol copolymer polyamide.

36. The antistatic viewfinder referred to in claim 35, wherein said antistatic resin is a polymer alloy.

37. The antistatic viewfinder referred to in claim 32, wherein the antistatic resin is comprised of a matrix resin of either Acrylics Polymethylmethacrylate (PMMA), Acrylonitrile Butadiene Styrene (ABS), or Polycarbonate (PC).

38. A Keplerian real image viewfinder in which an object image formed by an object lens is observed through an eyepiece, comprising:

an optical member which forms an image formation area that includes an image plane on which the object image is formed by an object lens unit, and which is made of antistatic resin wherein the resin itself has conductivity;

a field stop which forms the image formation area that includes the image plane on which the object image is formed by the object lens unit; and a holding member which holds said optical member and said field stop, and which forms the image formation area that includes the image plane on which the object image is formed by the object lens.

39. The Keplerian real image viewfinder referred to in claim 38, wherein said antistatic resin comprises a matrix resin and a hydrophilic polymer.

40. The Keplerian real image viewfinder referred to in claim 39, wherein said hydrophilic polymer is either methoxypolyethylene glycol methacrylate copolymer, high-molecular-weight polyethylene glycol, epichlorohydrine/ethylene oxide copolymer, methacrylate polymer containing quaternary ammonium salt, or polyethylene glycol copolymer polyamide.

41. The Keplerian real image viewfinder referred to in claim 40, wherein said antistatic resin is a polymer alloy.

42. The antistatic viewfinder referred to in claim 38, wherein the antistatic resin is comprised of a matrix resin of either Acrylics Polymethylmethacrylate (PMMA), Acrylonitrile Butadiene Styrene (ABS), or Polycarbonate (PC).

43. A Keplerian real image viewfinder in which an object image formed by an object lens is observed through an eyepiece, comprising:
   an optical member which forms an image formation area that includes an image plane on which the object image is formed by an object lens unit;
   a field stop which forms the image formation area that includes the image plane on which the object image is formed by the object lens unit, and which is made of antistatic resin wherein the resin itself has conductivity; and
   a holding member which holds said optical member and said field stop, and which forms the image formation area that includes the image plane on which the object image is formed by the object lens unit.

44. The Keplerian real image viewfinder referred to in claim 43, wherein said antistatic resin comprises a matrix resin and a hydrophilic polymer.

45. The Keplerian real image viewfinder referred to in claim 44, wherein said hydrophilic polymer is either methoxypolyethylene glycol methacrylate copolymer, high-molecular-weight polyethylene glycol, epichlorohydrine/ethylene oxide copolymer, methacrylate polymer containing quaternary ammonium salt, or polyethylene glycol copolymer polyamide.

46. The Keplerian real image viewfinder referred to in claim 45, wherein said antistatic resin is a polymer alloy.

47. The antistatic viewfinder referred to in claim 43, wherein the antistatic resin is comprised of a matrix resin of either Acrylics Polymethylmethacrylate (PMMA), Acrylonitrile Butadiene Styrene (ABS), or Polycarbonate (PC).

48. A Keplerian real image viewfinder in which an object image formed by an object lens is observed through an eyepiece, comprising:
   an optical member which forms an image formation area that includes an image plane on which the object image is formed by an object lens unit;
   a field stop which forms the image formation area that includes the image plane on which the object image is formed by the object lens unit; and
   a holding member which holds said optical member and said field stop, and which forms the image formation area that includes the image plane on which the object image is formed by the object lens unit, and which is made of antistatic resin wherein the resin itself has conductivity.

49. The Keplerian real image viewfinder referred to in claim 48, wherein said antistatic resin comprises a matrix resin and a hydrophilic polymer.

50. The Keplerian real image viewfinder referred to in claim 49, wherein said hydrophilic polymer is either methoxypolyethylene glycol methacrylate copolymer, high-molecular-weight polyethylene glycol, epichlorohydrine/ethylene oxide copolymer, methacrylate polymer containing quaternary ammonium salt, or polyethylene glycol copolymer polyamide.

51. The Keplerian real image viewfinder referred to in claim 50, wherein said antistatic resin is a polymer alloy.

52. The antistatic viewfinder referred to in claim 48, wherein the antistatic resin is comprised of a matrix resin of either Acrylics Polymethylmethacrylate (PMMA), Acrylonitrile Butadiene Styrene (ABS), or Polycarbonate (PC).

* * * * *